(12) United States Patent
Schneider et al.

(10) Patent No.: US 11,271,850 B2
(45) Date of Patent: Mar. 8, 2022

(54) SOFTWARE DEFINED NETWORK FORWARDING

(71) Applicant: NEC Laboratories Europe GmbH, Heidelberg (DE)

(72) Inventors: Fabian Schneider, Darmstadt (DE); Andreas Ripke, Neckargemuend (DE); Peer Hasselmeyer, Frankfurt (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/490,603

(22) PCT Filed: Mar. 23, 2017

(86) PCT No.: PCT/EP2017/057020
§ 371 (c)(1),
(2) Date: Sep. 3, 2019

(87) PCT Pub. No.: WO2018/171889
PCT Pub. Date: Sep. 27, 2018

(65) Prior Publication Data
US 2020/0021519 A1 Jan. 16, 2020

(51) Int. Cl.
*H04L 12/721* (2013.01)
*H04L 12/751* (2013.01)
(Continued)

(52) U.S. Cl.
CPC ............ *H04L 45/38* (2013.01); *H04L 45/02* (2013.01); *H04L 45/64* (2013.01); *H04L 45/74* (2013.01); *H04L 49/254* (2013.01); *H04L 69/164* (2013.01)

(58) Field of Classification Search
None
See application file for complete search history.

(56) References Cited

U.S. PATENT DOCUMENTS

2012/0311691 A1* 12/2012 Karlin ................ H04L 63/0236
726/12
2014/0369228 A1 12/2014 Sampath et al.
(Continued)

FOREIGN PATENT DOCUMENTS

WO WO-2014175423 A1 * 10/2014 ............. H04L 45/38

OTHER PUBLICATIONS

Yang, Ji et al. "FOCUS: Function Offloading from a Controller to Utilize Switch Power," 2016 IEEE Conference on Network Function Virtualization and Software Defined Networks (NFV-SDN), IEEE, Nov. 7, 2016, pp. 199-205, XP033093248.
(Continued)

*Primary Examiner* — Saad Khawar
(74) *Attorney, Agent, or Firm* — Leydig, Voit & Mayer, Ltd.

(57) ABSTRACT

A software-defined networking ("SDN") capable forwarding switch includes ports for receiving and/or outputting data packets and a packet pipeline including a forwarding table. The forwarding table is configured to contain a number of flow table entries ("FTEs"), that determine the forwarding switch's configuration and control behavior. The switch further includes a control engine configured to manipulate the forwarding switch's forwarding tables by adding, updating, and/or removing FTEs in the forwarding tables. An FTE of a forwarding table is configured to contain a specific action part that includes an action instruction to create a control packet and to send it to the control engine. The control packet includes embedded control instructions that cause the control engine to change the forwarding switch's configuration and/or control behavior.

14 Claims, 5 Drawing Sheets

(51) Int. Cl.

| | |
|---|---|
| *H04L 12/715* | (2013.01) |
| *H04L 12/741* | (2013.01) |
| *H04L 12/937* | (2013.01) |
| *H04L 29/06* | (2006.01) |
| *H04L 45/00* | (2022.01) |
| *H04L 45/02* | (2022.01) |
| *H04L 45/64* | (2022.01) |
| *H04L 45/74* | (2022.01) |
| *H04L 49/253* | (2022.01) |
| *H04L 69/164* | (2022.01) |

(56) References Cited

U.S. PATENT DOCUMENTS

| | | | |
|---|---|---|---|
| 2016/0112248 A1* | 4/2016 | Torigoe | H04L 12/6418 370/218 |
| 2016/0149819 A1 | 5/2016 | Hussain et al. | |
| 2017/0041209 A1* | 2/2017 | Joshi | H04L 45/02 |
| 2018/0241695 A1* | 8/2018 | Vaishnavi | H04L 41/20 |

OTHER PUBLICATIONS

Zhou, Shijie et al. "A Flexible and Scalable High-Performance OpenFlow Switch on Heterogeneous SoC Platforms," 2014 IEEE 33$^{rd}$ International Performance Computing and Communications Conference (IPCCC), IEEE, Dec. 5, 2014, pp. 1-8, XP032725863.

\* cited by examiner

SOFTWARE DEFINED NETWORK FORWARDING

CROSS-REFERENCE TO PRIOR APPLICATIONS

The present application is a U.S. National Phase Entry under 35 U.S.C. § 371 of International Application No. PCT/EP2017/057020, filed on Mar. 23, 2017 and hereby incorporated by reference. The International Application was published in English on Sep. 27, 2018 as WO 2018/171889 under PCT Article 21(2).

FIELD

Embodiments of the present invention relate to a software-defined networking ("SDN"), capable forwarding element, in particular SDN switch. Furthermore, embodiments of the present invention relate to a method for operating an SDN capable forwarding element.

BACKGROUND

An issue in today's SDN networks is that control is widely taken away from the forwarding elements and is associated with SDN controllers that transmit, via control channels, instructions to the forwarding elements on how to forward (or process, in general) network traffic arriving at the forwarding element. Therefore, conventional software defined networks have the problem, that communication between the SDN forwarding elements, such as switches and routers, and the SDN controller causes overhead in terms of delay and control channel bandwidth. Moreover, the corresponding control engine inside an SDN forwarding element, sometime also referred to as SDN agent, is a bottleneck, because the agent runs typically in the GPU of the forwarding element and has to en/-decrypt the communication over the control channel to ensure security between the controller and the forwarding element.

Another issue relates to the concept of stateful forwarding, which has recently been introduced (for reference see, for instance, G. Bianchi, M. Bonola, A. Capone, and C. Cascone: "OpenState: Programming Platform-independent Stateful OpenFlow Applications Inside the Switch", in ACM SIGCOMM Computer Communication Review, vol. 44, no. 2, pp. 44-51, 2014). The basic idea is to keep state inside a forwarding element, such as, e.g., a network switch or a router, and to adapt packet forwarding depending on the current state. The state is updated according to certain rules and in accordance with the data of the received packets (usually the packet headers).

SUMMARY

In an embodiment, the present invention provides a software-defined networking ("SDN") capable forwarding switch. The switch includes ports for receiving and/or outputting data packets and a packet pipeline including a forwarding table. The forwarding table is configured to contain a number of flow table entries ("FTEs"), that determine the forwarding switch's configuration and control behavior. The switch further includes a control engine configured to manipulate the forwarding switch's forwarding tables by adding, updating, and/or removing FTEs in the forwarding tables. An FTE of a forwarding table is configured to contain a specific action part that includes an action instruction to create a control packet and to send it to the control engine. The control packet includes embedded control instructions that cause the control engine to change the forwarding switch's configuration and/or control behavior.

BRIEF DESCRIPTION OF THE DRAWINGS

Embodiments of the present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
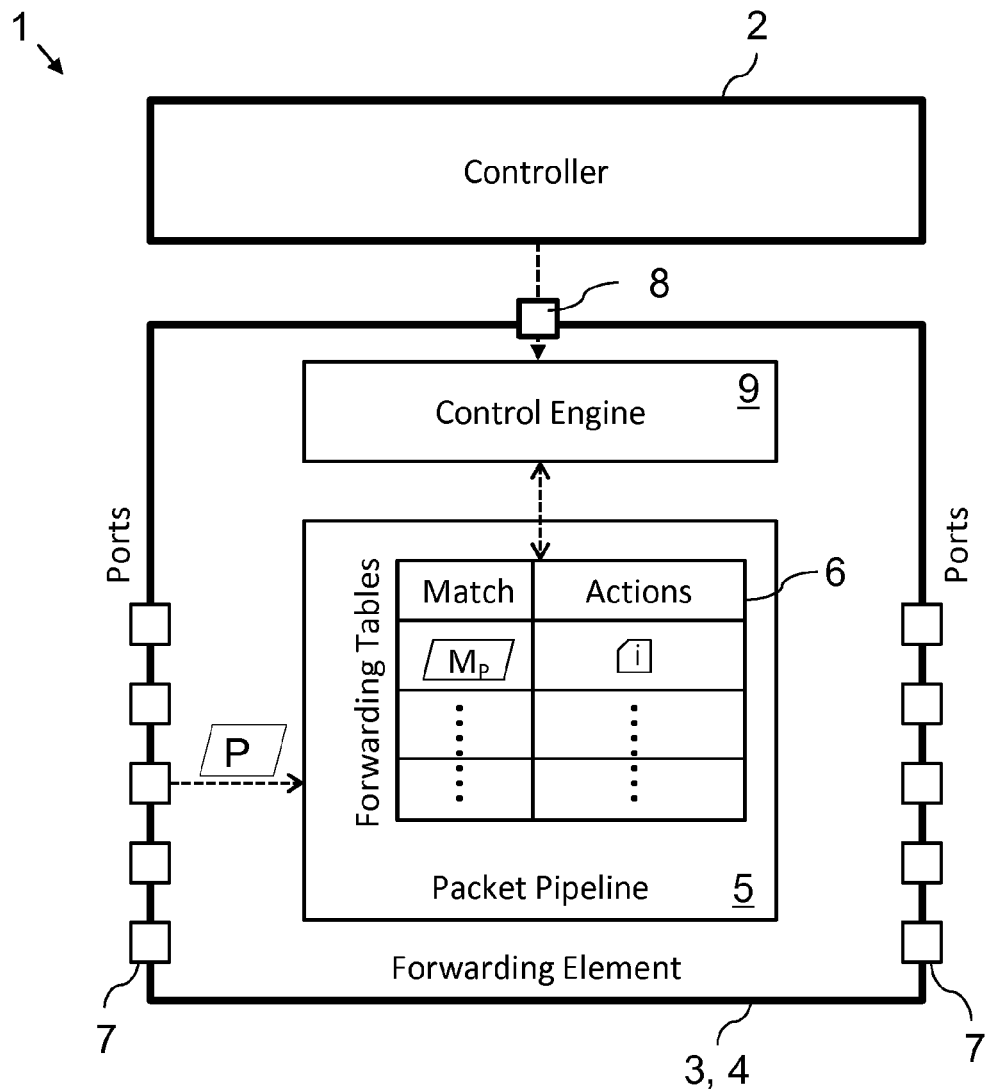
FIG. 1 is a schematic view illustrating an embodiment of a forwarding element and its controller in accordance with the SDN system architecture.

Stateful forwarding requires keeping the current state. In prior art this is done in a dedicated state table, which is kept inside (hardware) forwarding elements, separate from other tables in the forwarding elements, most notably separate from the forwarding table(s).

Keeping such a state table inside forwarding elements poses a number of problems. First, the state table requires memory space. Such memory space either needs to be added to the forwarding element, which is expensive, or it is taken away from other tables, e.g. a forwarding table, which reduces the size of the latter. Second, maintaining an additional table requires appropriate management functions. Creating such management functions needs additional development effort, incurs additional equipment costs, and increases the complexity of the forwarding element making it more prone to errors.

Embodiments of the present invention improve and further develop an SDN capable forwarding element as well as a method for operating an SDN capable forwarding element in such a way that the above issues are overcome or at least partially alleviated.

Disclosed is an SDN capable forwarding element, in particular SDN switch, comprising a number of ports for receiving and/or outputting data packets, a packet pipeline including at least one forwarding table, wherein the at least one forwarding table is adapted to contain a number of flow table entries, FTEs, that determine the forwarding element's configuration and control behavior, a control engine configured to manipulate the forwarding element's forwarding tables by adding, updating, and/or removing FTEs in the forwarding tables, wherein a forwarding table's FTE is configured to contain a specific action part that includes an action instruction to create a control packet and to send it to the control engine, said control packet including embedded control instructions that cause the control engine to change the forwarding element's configuration and/or control behavior.

Disclosed is a method for operating an SDN capable forwarding element, the method comprising: receiving and/or outputting data packets via a number of ports, providing a packet pipeline by configuring at least one forwarding table, wherein the at least one forwarding table is adapted to contain a number of flow table entries, FTEs, that determine the forwarding element's configuration and control behavior, manipulating, by a control engine, the forwarding element's forwarding tables by adding, updating, and/or removing FTEs in the forwarding tables, and configuring, in a forwarding table's FTE, a specific action part that includes an action instruction to create a control packet and to send it to the control engine, said control packet including embedded control instructions that cause the control engine to change the forwarding element's configuration and/or control behavior.

According to an embodiment of the invention it has been recognized that in-switch generated control messages can be used in order to change a forwarding element's configuration and/or control behavior and, in particular, to update/add/remove forwarding rules in order to mimic stateful forwarding behavior. Consequently, embodiments of the invention achieve the benefit of replacing one or more dedicated state tables by rules inside one or more packet forwarding tables.

Embodiments of the invention relate to methods for realizing state-aware software-defined networking by using message generation functions inside SDN-enabled switches. Such messages, termed control packets, are created inside the switch, forwarded to its control plane, and result in manipulating the switch's forwarding state, for instance by updating the switch's forwarding rules, thereby realizing state-aware forwarding.

Generally, forwarding elements include a packet pipeline with one or more forwarding tables. Each forwarding table is adapted to contain a number of FTEs that each comprise a match part and an actions part. The match part includes a match description for incoming data packets and the actions part includes action instructions to be executed by the forwarding element in case an incoming data packet matches the match description of the match part. Embodiments of the invention introduce a specific action part in a forwarding table's FTE that is configured to instruct the packet pipeline to create the control packet.

In an embodiment, the invention provides a method to get rid of a dedicated state table for realizing stateful forwarding, but still be able to do forwarding based on state information. The function of the state table may be instead realized by a combination of rules, i.e. FTEs, in a modifiable forwarding table and the capability of creating control messages by such FTEs and sending them to the control engine of the forwarding element. The mentioned capability of creating and sending control messages may be implemented, for instance, by using an approach termed in-switch packet generation (as described in Roberto Bifulco, Julien Boite, Mathieu Bouet, Fabian Schneider: "Improving SDN with InSPired Switches", in Proceedings ACM Symposium on SDN Research (SOSR), 2016, http://conferences.sigcomm.org/sosr/2016/papers/sosr_paper42.pdf) or by means of packet templates (as described in WO 2015/000517 A1).

Embodiments of the invention achieve the advantage of reduced complexity of switch hardware and implementation as no dedicated state table is required to be separately managed and maintained, while keeping the benefits of in-switch packet generation and stateful flow processing. Consequently, embodiments of the invention can be suitably implemented in SDN switches offering a lightweight solution to supporting stateful forwarding such switches. Moreover, embodiments can be implemented in programmable flow controllers and switches to delegate more control to switches.

Embodiments of the invention extend to corresponding systems, methods, and computer program products such as computer readable storage media having instructions stored thereon which are operable to program a programmable processor to carry out a method as described in the aspects and embodiments set out below or recited in the claims and/or to program a suitably adapted computer to provide the apparatus recited in any of the claims.

According to an embodiment the specific action part in a forwarding table's FTE may be installed and/or configured either by an operator of the forwarding element or by an SDN controller in charge of controlling the forwarding element.

According to an embodiment, the embedded control instructions of the specific action part may include FTE manipulation instructions that cause the control engine to add, update, and/or remove FTEs in one or more of the forwarding element's forwarding tables.

According to an embodiment the specific action part in a forwarding table's FTE may be configured to contain a template for the control packet to be created, i.e. the control packet creation may be performed by means of using packet templates, for instance in accordance with the basic mechanism described in WO 2015/000517 A1. In addition or alternatively, the specific action part in a forwarding table's FTE may be configured to instruct the packet pipeline i) what data to copy into the control packet, and/or ii) where to send the control packet, e.g. by means of specific template handling instructions.

Specifically, an FTE's specific action part may contain a template for the control packet to be created. The template may consist of values for both the control packet header and its content. Besides other information, the header may in particular contain as its destination address the address of the respective forwarding element itself. Alternatively, the destination address may be the address of another forwarding element (allowing delegation of control of network parts to other network elements). The content of the control packet may contain the instructions to add new flow entries to the forwarding table, allowing packets to be forwarded in both directions. The particularities identifying the packets to be forwarded, specifically the address matching rules, may be left empty in the template. The data may be filled in by instructions in the specific action field of the forwarding table rule, which copy relevant data (such as source and destination IP addresses) into the rules inside the control packet.

According to an embodiment, functions may be provided for setting certain data fields in the created control packet. According to embodiments, both control packet header and control packet body may be configured to be modifiable, as some fields need to be changed according to data contained in the initial packet matching the respective forwarding table rule.

After creating the control packet, it needs to be sent to its destination, which is the control engine inside the forwarding element. This can be accomplished in multiple ways. One solution is to send the packet out a physical port. That physical port is in turn connected to another physical port which is forwarding the received control packet to the control engine. Instead of using an external port, a port that is wired inside the forwarding element to a switch-internal input port may be used for sending the control message to the forwarding element's control engine, removing the need of wiring together external ports. Still another embodiment for passing the control message to the control engine is via a forwarding-element-internal function, such as an explicit OpenFlow action, e.g. OFPAT_OUTPUT to the LOCAL port.

According to an embodiment the control engine may be configured to accept control messages from a predefined restricted set of source addresses only. In such case, the source IP address inside the control packets needs to match one of the allowed source addresses in the switch's access control list. Both source and destination IP addresses of the control packet can be set in the described way by appropriate copy actions in the forwarding table.

According to an embodiment, in order to ensure proper handling and forwarding of incoming packets, the specific action part in a forwarding table's FTE may also include, in addition to a control packet creation instruction, a (conventional) forwarding rule for incoming packets matching the match part of the FTE.

According to an embodiment the control packets may be configured to use a connection-less transport protocol, in particular the User Datagram Protocol UDP. Possible disadvantages of UDP can be neglected, in particular since the probability that the packet gets lost on its short (and in some implementations completely switch-internal) transport path are minimal. On the other hand, such implementation would avoid the overhead of creating (TCP or other) connections. For instance, in case of OpenFlow this can be done using auxiliary connections, as described in the standard document Open Networking Foundation: "OpenFlow Switch Specification", Ver 1.3.5, April, 2015, ONF TS-023, in Section 6.3.8, which is incorporated herein by way of reference.

Since embodiments of the present invention described hereinafter in greater detail rely on the concepts of Software-Defined Networking (SDN) in combination with the OpenFlow protocol, at first, for ease of understanding, some essential aspects of these concepts will be briefly summarized, while it is generally assumed that those skilled in the art are sufficiently familiar with the respective technologies.

The Software-Defined Networking (SDN) paradigm (as specified in https://www.opennetworking.org/images/stories/downloads/sdn-resources/technical-reports/TR_SDN-ARCH-Overview-1.1-11112014.02.pdf) brings a separation of packet forwarding (data plane) and the control plane functions. In SDN, network elements' forwarding functions (data plane) are programmed by a centralized network controller (control plane). Specifically, network elements, such as switches, routers or the like expose a programming interface towards the network controller to add, modify, and delete entries in the flow tables of these network elements. The flow table entries are used to determine where to forward traffic and what processing steps are applied to the traffic before forwarding it.

Being widely adopted, the OpenFlow protocol provides flow-level abstractions for remote programming of, e.g., a switch's data plane from a centralized controller. This controller instructs an underlying switch with per-flow rules by means of specific 'flow_mod' messages. Such message contains match and action parts with the first specifying the packet headers to match and with the second applying a particular processing decision to all the packets belonging to the specified flow. These forwarding rules are translated into forwarding table statements and become installed as flow table entries (FTEs) into one or several forwarding tables of a table pipeline (for reference, cf. https://www.opennetworking.org/technical-communities/areas/specification).

FIG. 1 illustrates an SDN system 1 in accordance with an embodiment of the present invention. The SDN system 1 comprises an SDN controller 2 and an SDN-capable forwarding element 3, which in the illustrated embodiment is an SDN switch 4. In real deployments, although not shown in FIG. 1, an SDN controller 2 will generally be in charge of controlling a plurality of SDN switches 4.

The SDN-capable switch 4 contains a packet pipeline 5 including one or more forwarding tables 6. For the purpose of clarity, only a single of these forwarding tables 6 is depicted in FIG. 1.

A forwarding table 6 contains a set of forwarding rules, sometimes also referred to as forwarding table entries, FTEs. As shown in FIG. 1, each rule or FTE consists at least of a match part (or field) and an action part/field. The terms 'part' and 'field' will be used synonymously hereinafter. The match field describes matching values for particular parts of data packets received by the switch 4. Matching includes specific values, value ranges, and partially or completely wildcarded value sets. Matching can be done on any number of parts of the packets, although it typically applies to header fields inside the packets, e.g. Ethernet and TCP/IP header fields.

The action field of a rule contains actions that instruct the forwarding element 3 about what to do with incoming packets matching the values in the match fields. Such actions include, among others, instructions for sending out packets to specific (physical or logical) ports 7, changing specific parts of packets, and/or creating new packets. In the embodiment of FIG. 1, the only FTE explicitly written in the depicted forwarding table 6 has the expression '$M_P$' as match description, and the expression 'i' denoting the action instructions.

In accordance with the principles of SDN systems, the controller 2 is instructing the switch 4 how it should handle data packets P flowing in and out of the switch 4. This is mainly done by manipulating the rules in the forwarding tables 6. To this end, the controller 2 sends instruction messages to the switch 4, for instance via a programming interface 8 towards the controller 2, in order to add, update, or remove rules in the switch's 4 forwarding tables 6. Such messages are processed by a control engine 9 inside the switch 4, updating rules in its forwarding tables 6, as shown in FIG. 1.

Embodiments of the invention use the described match and action fields in the forwarding tables 6 to realize stateful forwarding behavior. In accordance with these embodiments a match/action rule is configured in a forwarding table 6 of the forwarding element 3 that, upon receipt of a matching packet P, sends instructions to the forwarding element 3 itself, in order to have the control engine 9 of the forwarding element 3 change the forwarding element's 3 configuration and/or control behavior, for instance by manipulating (i.e. add/update/delete) one or more entries in one or more of the forwarding element's 3 forwarding tables 6.

According to an embodiment the above is realized by enabling the forwarding element 3 to send control packets, which include embedded action instructions, to the forwarding element's 3 own control engine 9. This can be achieved by either a forwarding-element-internal function (as will be described in greater detail below in connection with FIG. 3c), or by sending such control packets out one of the ports and receiving it back on another port, which is (physically or logically) connected to the control engine 9 (as will be described in greater detail below in connection with FIGS. 3a and 3b). Here, it should be noted that although the present invention is not limited to switches as forwarding elements, for ease of description these control packets hereinafter will sometimes be denoted briefly as 'in-switch generated' messages.

Figure 2:
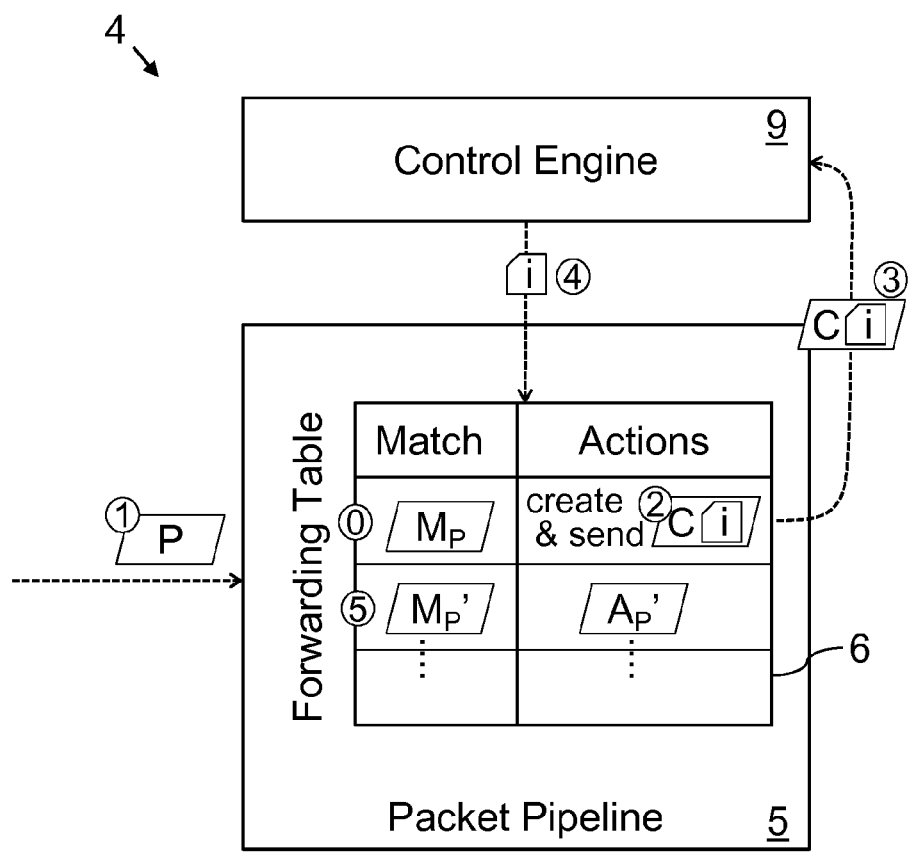
FIG. 2 is a schematic view illustrating an OpenFlow implementation of a switch in accordance with an embodiment of the present invention.

As already mentioned above, embodiments of the present invention can be realized by using an OpenFlow-enabled switch 4, which supports actions in its flow (or forwarding) table 6 that enable the creation and sending of control packets, as shown in the embodiment of FIG. 2. It is noted that throughout the figures, like reference numerals denote like components. In this embodiment, a controller (not shown) sends OpenFlow instructions to the switch 4. These instructions tell the switch 4 to add rules to its forwarding table 6 which create messages, i.e. control packets, that are directed or addressed to the switch 4 itself. These control packets, in turn, tell the switch 4 to manipulate its forwarding tables as desired.

Specifically, as shown at preparative step 0, a match-action rule (i.e. FTE) is installed in the forwarding table 6 which contains a rule with match description $M_P$ that matches packets P and, in response, creates and sends a packet C with contained control instructions i. Then, when a packet P is received at the switch 4, as shown at step 1, the incoming packet P is compared to the entries in the forwarding table 6. As described above, the rule with match description $M_P$ is matching the incoming packet P and, thus, as shown at step 2, the FTE's corresponding actions tell the packet pipeline 5 to create a control packet C. In case of using templates, the actions may also include template handling instructions telling the packet pipeline 5 how to generate the control packet C, in particular what data to copy into the control packet C at which place of the template. Finally, the actions tell the packet pipeline 5 to send out the packet once the creation of the control packet C is finished. As shown at step 3, the packet is sent out to the control engine 9 of the switch 4, for instance by looping the packet back to the control engine 9, as will be described in greater detail in connection with FIG. 3. At the same time, packet P is sent to its next hop (not shown).

Once the packet C is received at the control engine 9, the control engine 9 executes the embedded control instructions i. In the embodiment shown in FIG. 2, it is assumed that the embedded instructions i are designed to tell the control engine 9 to install a new flow entry in the switch's 4 forwarding table 6 (consisting of match part $M_P'$ and action part $A_P'$). Consequently, the control engine 9 sends corresponding instructions, termed i', to the forwarding table 6, as shown at step 4. Finally, as shown at step 5, by processing these instructions i', the new flow entry becomes added to the forwarding table 6.

While the embodiment illustrated in FIG. 2 relates to adding new flow entries to the switch's 4 forwarding table 6, it should be noted that the present invention is by no way limited to such addition of new FTEs. Rather, it should be noted that the control instructions i that are embedded into the created control packet C can include instructions extending to the complete breadth of OpenFlow interactions.

While FIG. 2 focuses on the general concept of changing a forwarding element's 3 configuration by means of control packet generation in the forwarding element's 3 packet pipeline 5, irrespective of the actual implementation method for passing on control packets to the control engine 9, FIG. 3 illustrates three different embodiments that focus on options for getting the generated control packets back to the forwarding element's 3 control engine 9.

The forwarding element's 3 structure shown in FIG. 3 corresponds to the structure of the forwarding elements shown in the previous figures. However, for the sake of clarity the packet pipeline 5 is depicted without showing any of the forwarding tables contained therein. In all three embodiments the way of an incoming packet P is depicted by dashed line arrows. Specifically, in each embodiment the packet P is received at an input port 7a, processed at the packet pipeline 5 and outputted via an output port 7b that is defined in the action field of a matching FTE.

Figure 3A:
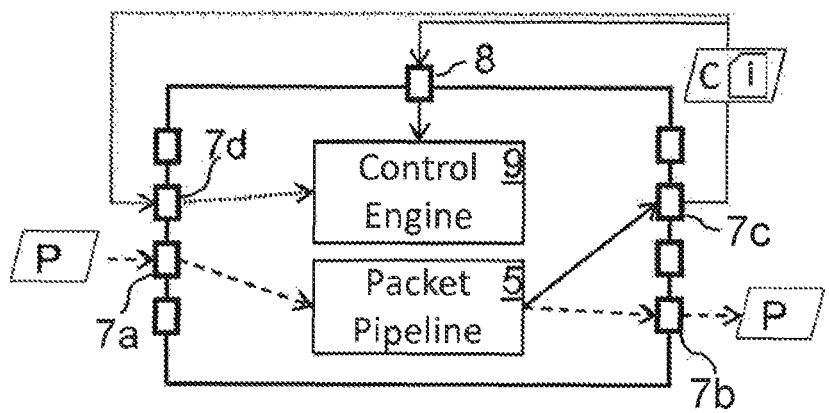
FIGS. 3*a*-3*c* are schematic views illustrating a switch with various implementations of in-switch generated message transport to the switch's control engine in accordance with embodiments of the present invention.

Referring to FIG. 3a, this figure shows an embodiment where the in-switch generated control packet C with the embedded instructions i is sent out via one of the forwarding element's 3 physical output ports 7c. According to one embodiment, indicated by the solid line arrow in FIG. 3a, this physical output port 7c is connected to the forwarding element's 3 programming interface 8 (i.e. the interface via which the forwarding element 3 receives instructions from its associated controller), which then forwards the received control packet C to the control engine 9. According to an alternative embodiment, indicated by the dotted line arrow in FIG. 3a, the respective physical output port 7c is connected to another physical port 7d, which then forwards the received control packet C to the control engine 9. Instead of using an external port, a port that is wired inside the forwarding element 3 to a switch-internal input port can be used for sending control message C, removing the need of wiring together external ports.

Figure 3B:
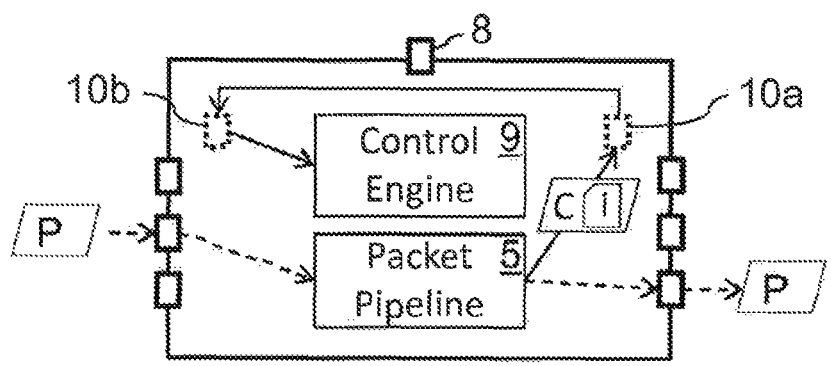

Referring to FIG. 3b, this figure shows an embodiment where internal logical ports 10 are provided inside the forwarding element 3. As indicated in FIG. 3b, the in-switch generated control packet C is sent from the packet pipeline 5 to one of these logical ports 10a, which is internally connected to another logical port 10b that forwards the control packet C to the control engine 9.

Figure 3C:
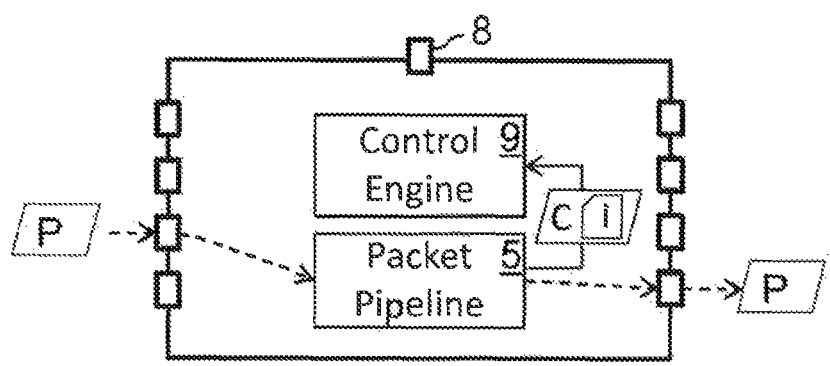

Finally, FIG. 3c illustrates an embodiment according to which the in-switch generated control message C is passed directly to the control engine 9 via an explicit OpenFlow action, e.g. OFPAT_OUTPUT to the LOCAL port (as specified in the OpenFlow standard, described in Open Networking Foundation: "OpenFlow Switch Specification", Ver 1.3.5, April, 2015, ONF TS-023).

As already mentioned above, by intelligent composition of the forwarding table rules on the one hand and the constructed, self-addressed control messages C on the other hand, stateful forwarding can be realized. As the controller 2 is controlling the (initial set of) rules in the forwarding element 3, it is responsible for creating appropriate rules which realize the stateful forwarding function.

According to an embodiment of the present invention an SDN switch 4 can be suitably applied for executing the task of bi-directional firewalling. In this context it may be assumed that there is a firewall policy that only allows the establishment of TCP traffic flows which are initiated from inside a network. By default, all traffic from the outside is blocked, i.e., all packets are dropped and not forwarded by the switch 4. In accordance with an embodiment of the present invention, there will be a rule in a forwarding table 6 of the switch 4 that matches all packets leaving the internal network. The rule may be constructed in such a way that it causes a threefold action as follows:

a) A first action creates a packet and sends it to the switch 4 itself, i.e. to the switch's 4 packet pipeline 5. Specifically, this packet instructs the switch 4 to add to its forwarding table 6 a new rule that forwards all further packets that belong to the same data flow (e.g., identified by IP header information) to the appropriate output port (as determined by the respective controller 2 and as encoded in this new rule). The newly created rule will take precedence over the packet generation rule as it is designed to be more specific in its match criteria and/or has higher priority (depending on the capabilities and rules of the SDN system used), thereby avoiding that forthcoming packets of the same data flow also trigger the generation of new flow rules.

b) A second action creates a packet and sends it to the switch 4 itself, i.e. again to the switch's 4 packet pipeline 5. Specifically, this packet instructs the switch 4 to add to its forwarding table 6 a new rule that forwards all packets that belong to the same data flow (e.g., identified by IP header information), but traverse the switch 4 in the opposite direction (i.e., from the remote system to the local one) to the appropriate switch port (as determined by the port of the incoming packet).

It should be noted that the instructions for parts a) and b) can be merged into a single created packet.

c) Finally, a third action forwards the packet to the appropriate output port (as determined by the corresponding controller 2 and as encoded in this rule).

Consequently, by means of a rule initiating or triggering the above actions a)-c), it is possible that a state—i.e. in this case the information about connections having been established from the inside to the outside—is encoded in the newly created forwarding table rules.

Figure 4:
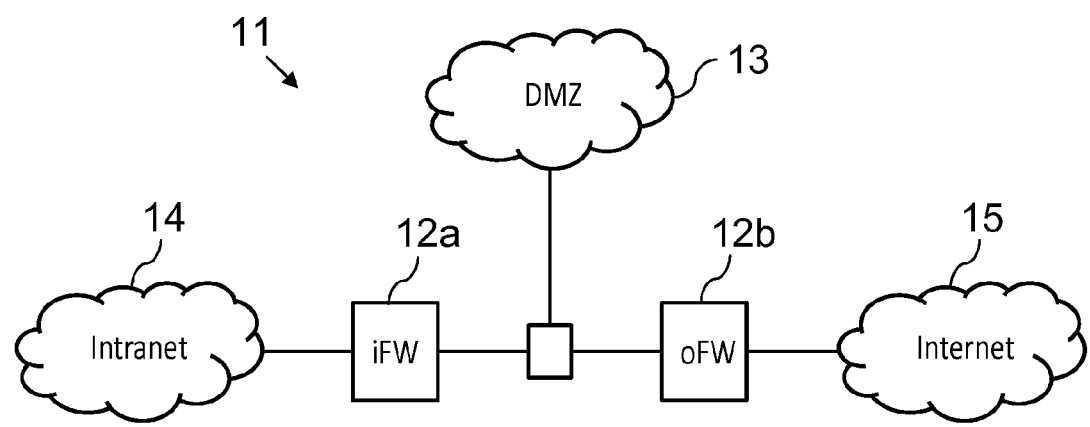
FIG. 4 is a schematic view illustrating an application scenario of an SDN forwarding element in a multi-stage firewall deployment in accordance with an embodiment of the present invention.

Another exemplary application scenario of the present invention is a multi-stage firewall 11, as depicted in FIG. 4. It should be noted that in real-world deployments it is not uncommon to deploy multiple firewalls 12 in succession to separate the demilitarized zone, DMZ 13, from the intranet 14. In accordance with embodiments of the invention the inner firewall, iFW 12a, may be configured to send control messages to the outer firewall, oFW 12b, to manage firewall rules for connections from the Intranet 14 to the Internet 15. The benefit of such approach is twofold:

a) In the course of such cascading firewall configuration where configuring iFW 12a implicitly implies configuring oFW 12b, explicit state learning needs to be done only on one FW (preferably on the iFW 12a). Said FW also configures the other FW (oFW 12b) for any newly learned state.

b) Both FWs 12a, 12b can be considered as a single FW that got split in half (iFW 12a, oFW 12b) for connections from the Intranet 14 to the Internet 15. Together with that split of the firewall, the rules are also split among the firewalls, resulting in each firewall only needing to host half of the firewall rules. This results in significant changes in the number of rules to be stored, compared to the traditional deployment of two firewalls managed independently.

Finally, it should be noted that embodiments of the present invention as described above might appear to have certain similarities with the "learn" action implemented in OpenvSwitch (for reference, see Man page of ovs-ofctl. http://openvswitch.org/support/dist-docs/ovs-ofctl.8.txt, lines 2182-2270). However, as will be easily appreciated by those skilled in the art, compared to that action, embodiments of the invention have the following differences:

1) Respective embodiments of the present invention do not require the additional implementation of a new action (e.g., "learn"). Rather, existing capabilities (packet generation, packet processing) are used to realize the method for changing flow tables.

2) Embodiments of present invention are not limited to only affecting flow tables, but can make use of the complete function set realized by the control engine, e.g., all functions described in the OpenFlow protocol (cf. Open Networking Foundation: "OpenFlow Switch Specification", Ver 1.3.5, April, 2015, ONF TS-023). In fact the "learn" action can only add or modify flow entries, and the possible actions in the added/modified flow entries are restricted to set_field and output actions.

3) Embodiments of the present invention are not limited to using values from predefined header fields, but allow the full feature set of the underlying packet creation method, including copying arbitrary bits.

4) Embodiments of the present invention are not limited to a single switch, but can send in-switch created control messages to other switches as well, allowing delegation of control of network parts to switches.

As already mentioned above, in accordance with embodiments of the invention the in-switch control packet creation mechanism may be performed according to the mechanisms described in Roberto Bifulco, Julien Boite, Mathieu Bouet, Fabian Schneider: "Improving SDN with InSPired Switches", in Proceedings ACM Symposium on SDN Research (SOSR), 2016, http://conferences.sigcomm.org/sosr/2016/papers/sosr_paper42.pdf). According to these principles, an in-switch packet generation operation may be described by the following three pieces of information:

trigger: the event in response of which a control packet is generated. For instance, a triggering event could be the reception of a given packet.

content: specifies the control packet's header and payload.

actions: defines what the switch should do with the control packet. For instance, which switch's port should be used to send out the generated control packet on the network.

To provide these components, a specific API (Application Programming Interface), in the above referenced denoted In-Switch Packet Generation (InSP) API, leverages the Open-Flow's abstractions, i.e., the flow table and instruction data structures, and adds two more data structures: a Packet Template Table and an In-Switch Packet Generation Instruction.

The Packet Template Table is the data structure used to store the content of the control packets the switch will generate. As the name suggests, a Packet Template Table Entry (PTE) specifies a template that is used for the generation of a control packet's content, with each PTE specifying the content for exactly one type of control packet. A PTE may be composed of three pieces: (i) a packet template id (pkttmp id); (ii) the packet content template; (iii) an array of copy operations. The pkttmp_id can be used to identify a PTE and to reference it from other data structures defined in the API. The packet content template may be specified as a byte array, which should have the same size of the packet that is going to be generated. Finally, the copy operations are applied whenever a new packet has to be generated. Each copy operation changes a subset of the PTE's packet content template's bytes. Once all the copy operations are applied, the resulting byte array is used as the generated control packet's content.

A copy operation can look like a regular copy between byte arrays, being completely specified by data source, offset in the source, offset in the destination, data length. The destination of the copy operation is always the generated control packet's content (which is originally a plain copy of the PTE's packet content template). The source of the copy operation may instead be the content of the packet that triggers the generation of a new packet.

To modify the Packet Template Table's entries, a Packet Template Modification (PKTTMP_MOD) message type can be defined. With a semantic similar to the one of OpenFlow's FLOW_MOD messages, a PKTTMP_MOD may be used to add or delete PTEs. If the PKTTMP_MOD message contains the "add" command, then it specifies all the information required by the PTE, i.e., pkttmp_id, packet content template and copy operations, if any. Instead, if the PKTTMP_MOD contains a "delete" command, only the pkttmp_id is specified.

Referring now to the second of the additional data structures, i.e. In-Switch Packet Generation Instruction, this is an instruction type to trigger the generation of a new packet. The instruction may contain a pkttmp id and a set of OpenFlow actions. The pkttmp id is used to identify the PTE that should be used to create the generated control packet's content, while the set of actions defines what should happen with the newly generated control packet. The main difference with OpenFlow's standard instructions is that the InSP instruction creates a new packet that the switch has to handle, in addition to the packet that matched the FTE. Thus, while the standard OpenFlow instructions are applied to the same packet that was matched by the FTE that triggered the instruction execution, the InSP instruction is instead just triggered by such packet and its execution has effects only on the newly generated control packet. As final effect, the original packet received by the switch, i.e., the triggering packet, will continue its processing on the switch's pipeline, while the processing of the newly generated control packet will depend by the actions defined in the InSP instruction.

The support for standard OpenFlow actions in the InSP instruction opens a number of possibilities for defining the behavior of the generated control packet. For example, a programmer may define an explicit forwarding action like the OpenFlow's OUTPUT action, selecting the switch's output port to use for the forwarding of the packet. Specifically, in accordance with the embodiment of the present invention, an internal forwarding action to the switch's control engine may be defined.

In another case, the programmer may instead inject the generated packet in the beginning of the switch's pipeline. For instance, this may be helpful when the desired output port is unknown at the moment in which the InSP instruction is defined, or when the actual output port should be decided by the current state of the switch.

As already mentioned above, an in-switch packet generation operation can be completely specified by the definition of the trigger, content and actions. The API presented so far allows a programmer at defining these three components. First, the programmer specifies the content by creating a PTE. Second, she specifies the actions by defining an InSP instruction. Finally, the packet generation trigger is specified by defining a FTE which includes the InSP instruction in its instructions list.

Assuming that a programmer (e.g. an operator of the switch or an SDN controller in charge of controlling the switch) has performed these three steps, the in-switch control packet generation process unfolds as follows. The switch receives a packet at one of its ports and injects it in the flow tables pipeline. The action set gets filed as the packet flows through the pipeline, since matching FTEs' instructions may write actions to it. If the packet is matched by a FTE that contains a specific action part including an InSP instruction as action instruction, then the packet generation process is triggered.

A new packet is created by copying the InSP instruction's packet content template. Then, copy operations are applied to the newly generated packet. For example, a copy operation may copy the received packet's source Ethernet address and write it to the new control packet's destination Ethernet address. Finally, the InSP instruction's actions are applied to the created control packet. It should be noted that the InSP instruction only contains actions that are immediately applied to a created control packet. That is, the newly generated control packet is not associated with an action set. The triggering packet, which is still being processed by the pipeline, continues its processing after the InSP instruction has been executed. That is, the triggering packet eventually exits the pipeline and its action set is executed.

Figure 5:
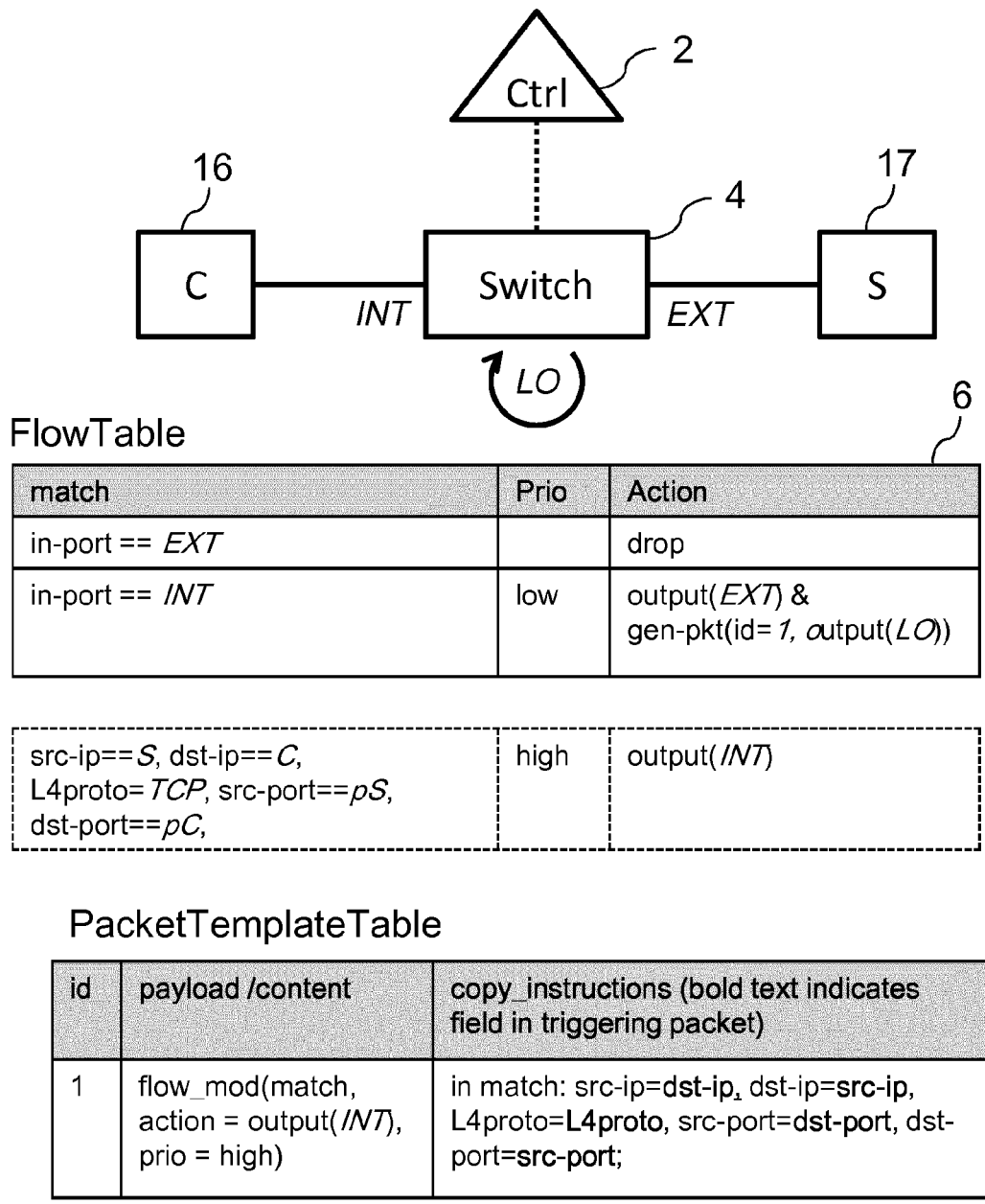
FIG. 5 is a schematic view illustrating control packet creation by means of using packet template tables in a switch applied in a firewall deployment in accordance with an embodiment of the present invention.

Referring to FIG. 5, this figure illustrates an implementation of the above mechanism in an SDN switch 4 that is applied in a firewall scenario controlling traffic between a client 16, C, and a server 17, S. Assuming that the client 16 is located in the intranet 14 and that the server 17 is located in the Internet 15, the scenario basically resembles the scenario of FIG. 4.

In an initial situation, the switch's 4 flow table or forwarding table 6 contains two FTEs: The first one specifies that 'external' packets, i.e. packets received at the switch's 4 port denoted 'EXT' (hence, including packets sent from the server 17 to the client 16), are dropped. The second one is an FTE that is configured to contain a specific action part including two action instructions: the first action instruction (output (EXT)') specifies that 'internal' packets, i.e. packets received at the switch's 4 port denoted 'INT' (hence, including packets sent from the client 16 to the server 17), are allowed to pass through and are outputted via the switch's 4 port 'EXT'. The second action instruction '(gen-pkt(id=1, output (LO)') instructs a control packet (denoted 'C' in FIGS. 2 and 3) generation, which is realized by using the illustrated packet template table. The 'id' contained in the packet generation instruction specifies which PTE of the packet template table to use for the packet creation. The packet generation instruction also contains the information that the generated control packet is to be sent out in form of a loopback ('LO'), i.e. by transmitting the control packet to the switch's 4 own control engine. In this regard, any of the embodiments described in connection with FIG. 3 may be implemented.

In the illustrated embodiment, in accordance with the payload/content information contained in the PTE with id=1, the control packet C will be generated in form of a flow_mod message. This means that the control packet C contains as embedded control instructions (denoted T in FIGS. 2 and 3) instructions for the switch's 4 control engine to add a new FTE (depicted in FIG. 5 by the dashed lines) to the switch's 4 flow table 6. According to the information contained in the respective PTE's payload field, this new FTE gets assigned the priority 'high' and the action instruction is specified as 'output(INT)'. The match part is specified by applying the copy instructions contained in the PTE. These copy instructions are designed in such a way that the new FTE (which is assumed to have a higher priority than the first FTE that contains the general drop instruction) allows packets that belong to the connection between client 16 and server 17 and that are sent in the opposite direction, i.e. from the server 17 to the client 16, to pass the firewall, while all other packets from the outside (that only match the first FTE) are still blocked. As such, the embodiment implements a stateful firewall example.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A software-defined networking ("SDN") capable forwarding switch comprising:
   ports for receiving and/or outputting data packets,
   a packet pipeline including a forwarding table, wherein the forwarding table is configured to contain a number of flow table entries ("FTEs"), that determine configuration and control behavior of the forwarding switch, and
   a control engine configured to manipulate the forwarding table by adding, updating, and/or removing FTEs in the forwarding table,
   wherein at least one of the ports is a physical port configured to loopback control packets created by the packet pipeline to another port that is physically or logically connected to the control engine, and
   wherein an FTE of the forwarding table is configured to contain a specific action part that includes an action instruction to instruct the packet pipeline to, in response to a data packet received at one of the ports including a matching part, create a control packet addressed to the forwarding switch and send the control packet to the forwarding switch, the control packet including embedded control instructions that cause the control engine to change the configuration and/or control behavior of the forwarding switch, wherein the embedded control instructions include FTE manipulation instructions that cause the control engine to add an FTE to, or remove an FTE from, the forwarding table.

2. The forwarding switch according to claim 1, wherein the embedded control instructions of the specific action part further include FTE manipulation instructions that cause the control engine to update an FTE in the forwarding table.

3. The forwarding switch according to claim 1, wherein the specific action part in the FTE is configured to contain a template for the control packet to be created.

4. The forwarding switch according to claim 1, wherein the control engine is configured to accept control messages from a predefined set of source addresses only.

5. A software-defined networking ("SDN") controller configured to control the forwarding switch of claim 1, the controller being further configured to install and/or configure the FTE with the specific action part in the forwarding table of the forwarding switch.

6. A method for operating software-defined networking ("SDN") forwarding switch, the method comprising:
   receiving and/or outputting data packets via ports,
   providing a packet pipeline by configuring a forwarding table, wherein the forwarding table is configured to contain a number of flow table entries, FTEs, that determine configuration and control behavior of the forwarding switch,
   manipulating, by a control engine, the forwarding table by adding, updating, and/or removing FTEs in the forwarding table, wherein at least one of the ports is a physical port configured to loopback control packets created by the packet pipeline to another port that is physically or logically connected to the control engine, and
   configuring, in an FTE of the forwarding table, a specific action part that includes an action instruction to, in response to a data packet received at one of the ports including a matching part, instruct the packet pipeline to create a control packet addressed to the forwarding switch and send the control packet to the forwarding switch, the control packet including embedded control instructions that cause the control engine to change the configuration and/or control behavior of the forwarding switch, wherein the embedded control instructions include FTE manipulation instructions that cause the control engine to add an FTE to, or remove an FTE from, the forwarding table.

7. The method according to claim 6, wherein the specific action part is installed and/or configured either by an operator of the forwarding switch or by an SDN controller in charge of controlling the forwarding switch.

8. The method according to claim 6, wherein the specific action part contains a template for the control packet to be created.

9. The method according to claim 8, wherein the template includes values for a header and contents of the control packet, wherein the header contains as a destination address the address of the forwarding element and/or the address of another forwarding element.

10. The method according to claim 6, comprising:
    sending the control packet out the at least one of the ports, and
    receiving the control packet on another one of the ports that is physically or logically connected to the control engine.

11. The method according to claim 6, wherein the specific action part further includes a forwarding rule for incoming packets matching a match part of the FTE.

12. The method according to claim 6, wherein the control packet is configured to use a connection-less transport protocol including a User Datagram Protocol, UDP.

13. A non-transitory computer readable medium comprising code for causing a forwarding switch to perform the method of claim 6.

14. A non-transitory computer readable medium comprising code for causing a forwarding switch to perform the method of claim 12.

* * * * *